July 20, 1943.  P. O. KROGH  2,324,587
LEVELING MEANS FOR VEHICLE BODIES
Filed July 31, 1941  6 Sheets-Sheet 1
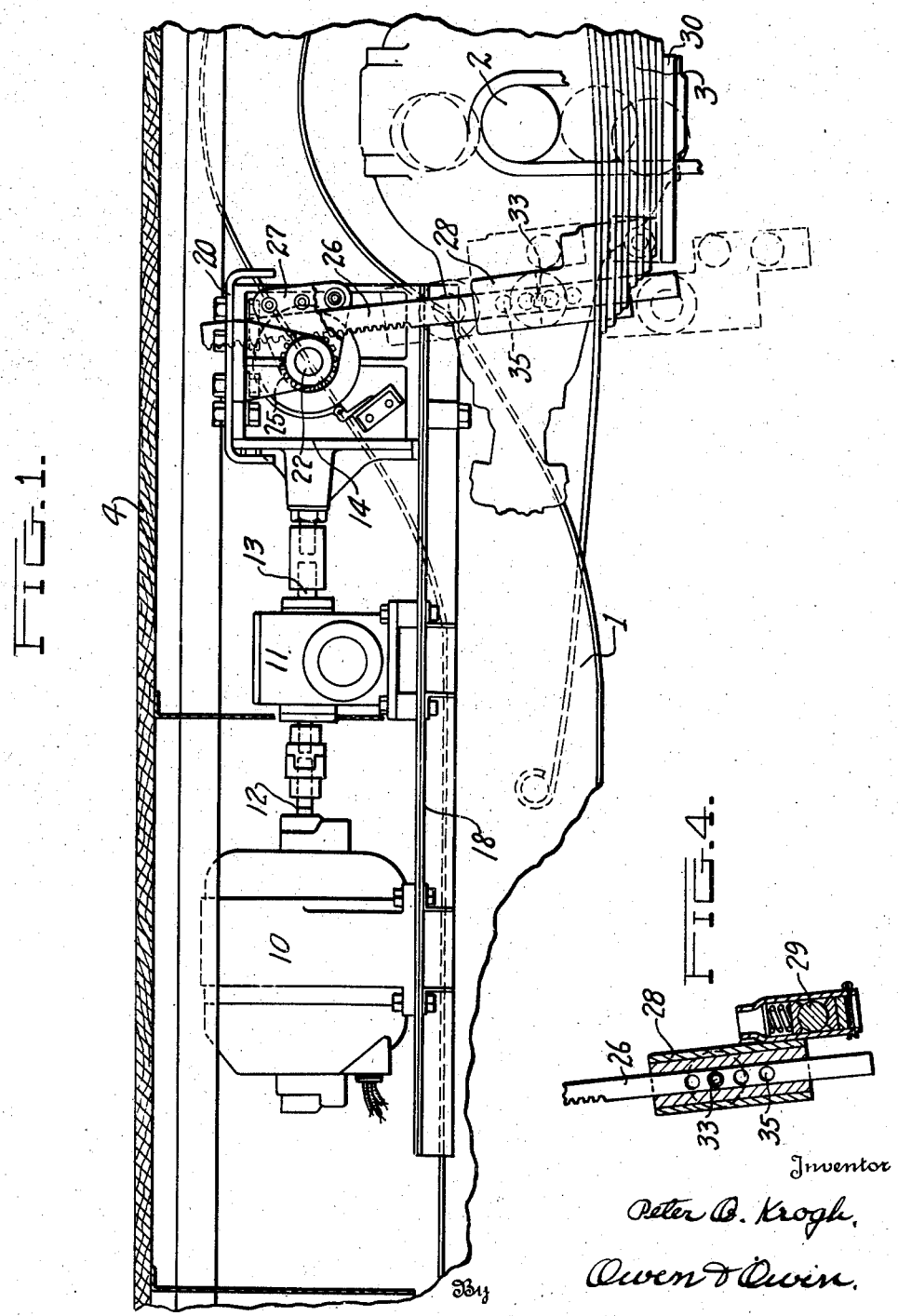

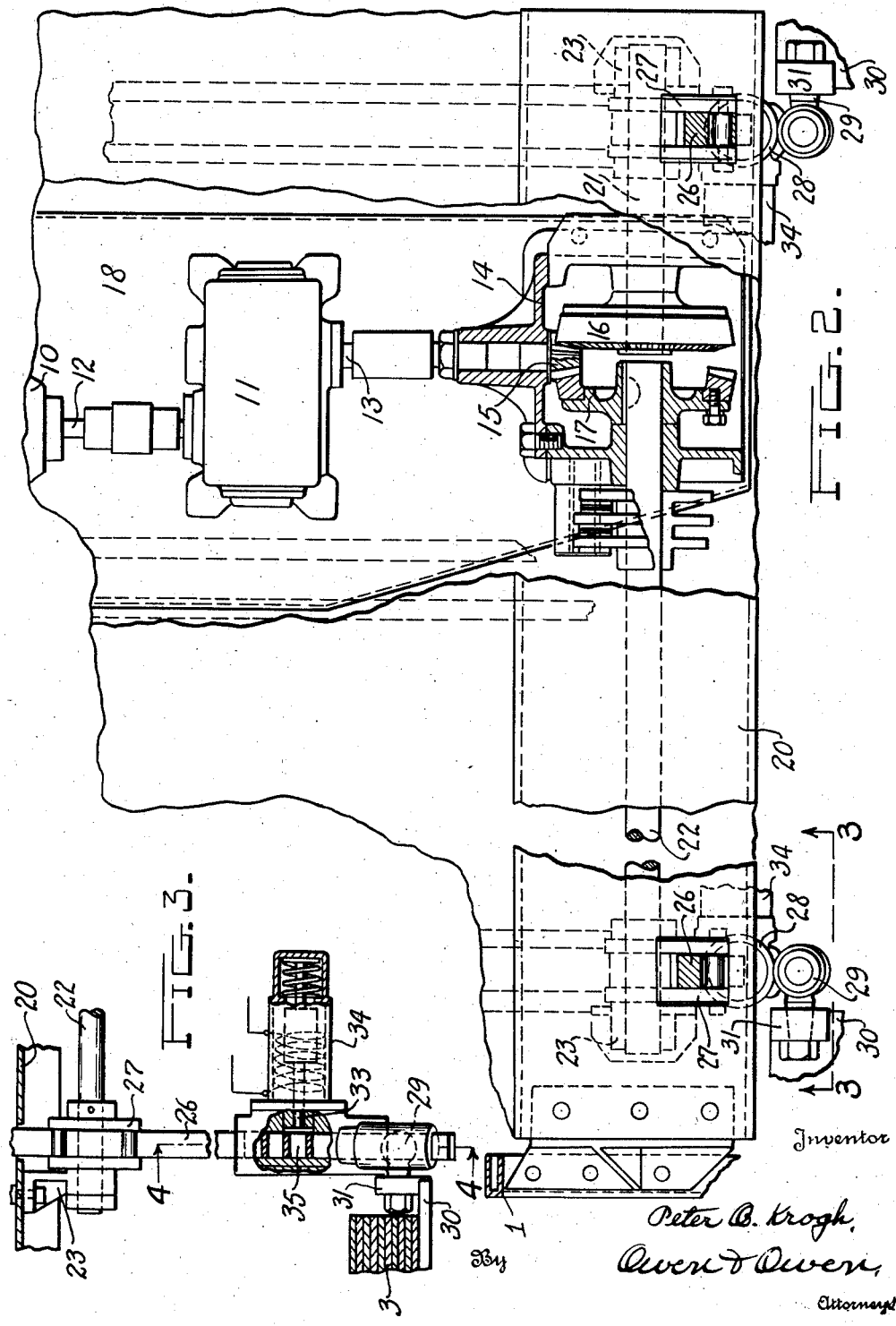

July 20, 1943. P. O. KROGH 2,324,587
LEVELING MEANS FOR VEHICLE BODIES
Filed July 31, 1941 6 Sheets-Sheet 3
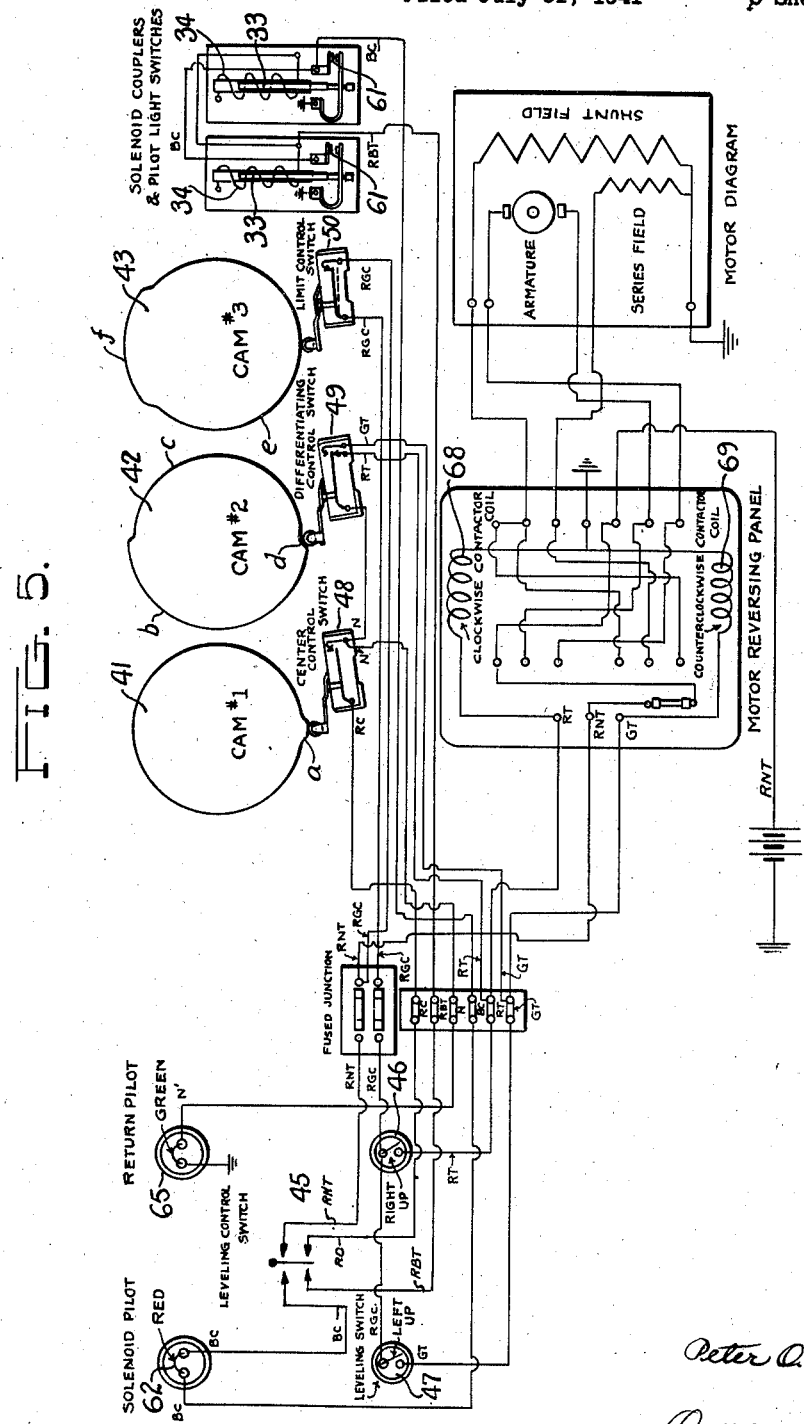

July 20, 1943.　　　P. O. KROGH　　　2,324,587
LEVELING MEANS FOR VEHICLE BODIES
Filed July 31, 1941　　　6 Sheets-Sheet 4
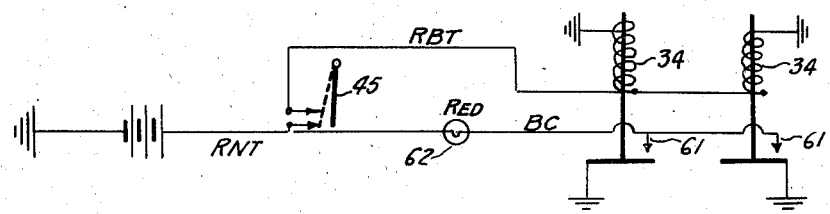
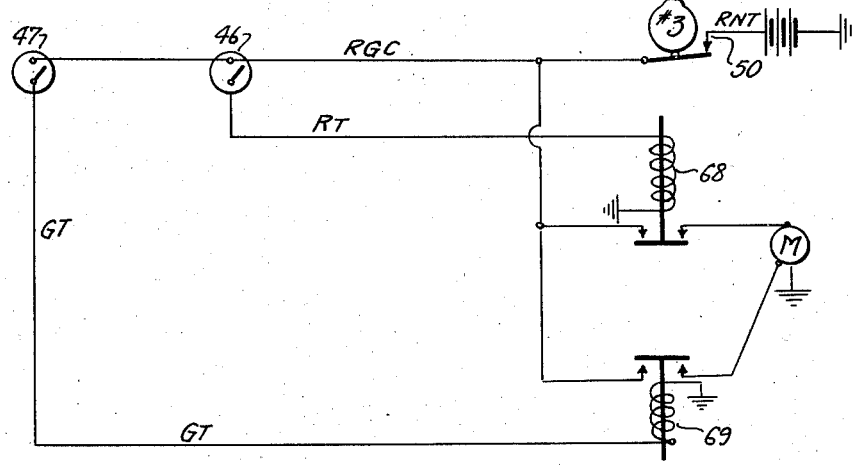
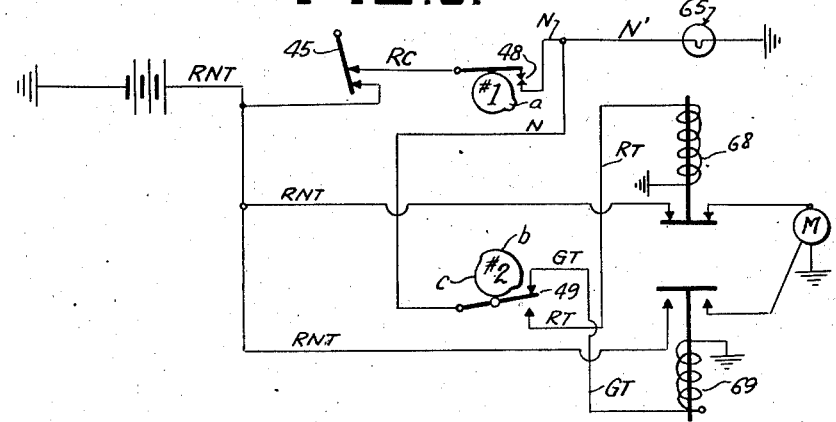
INVENTOR
Peter O. Krogh,
BY Owen & Owen,
ATTORNEYS.

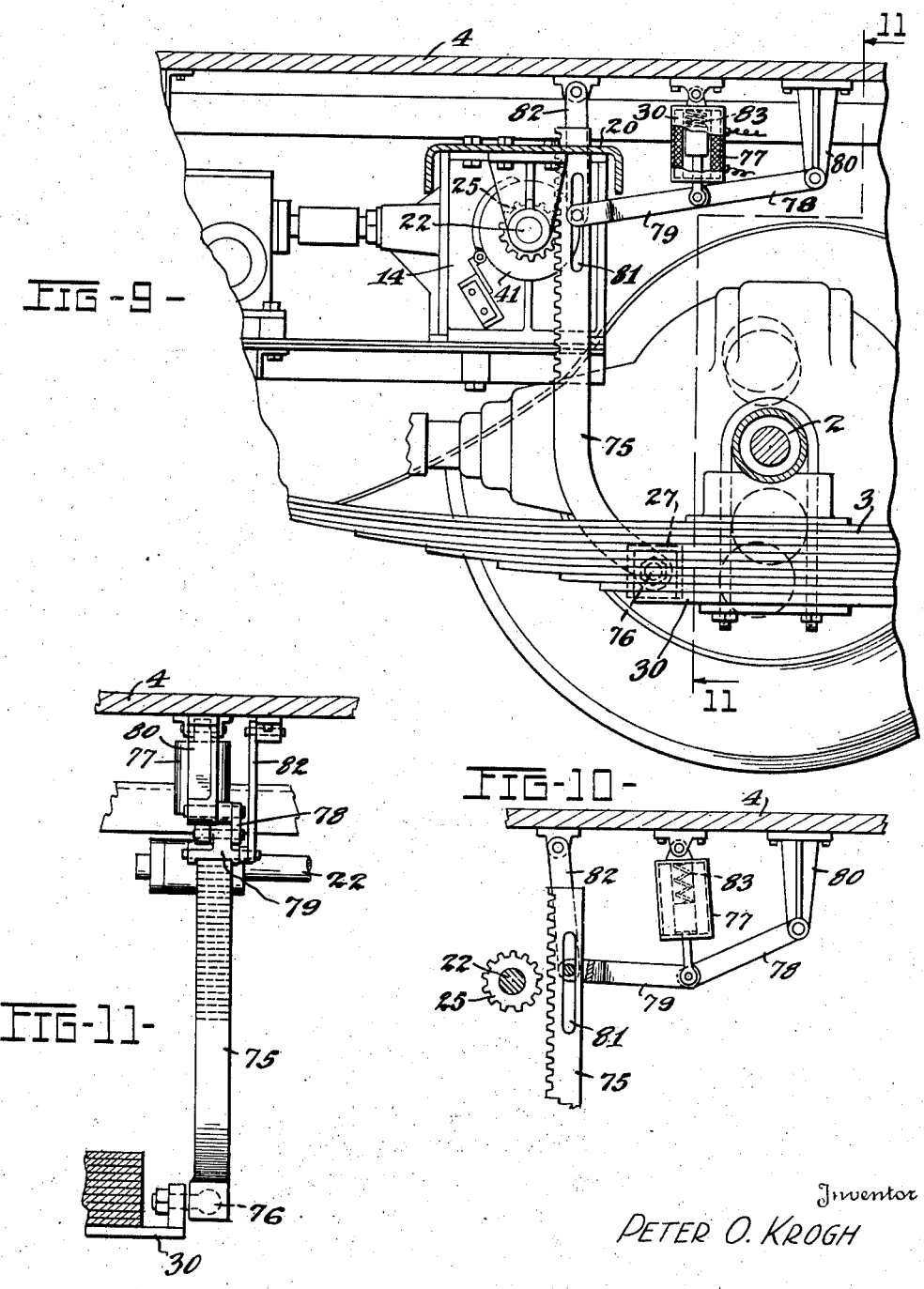

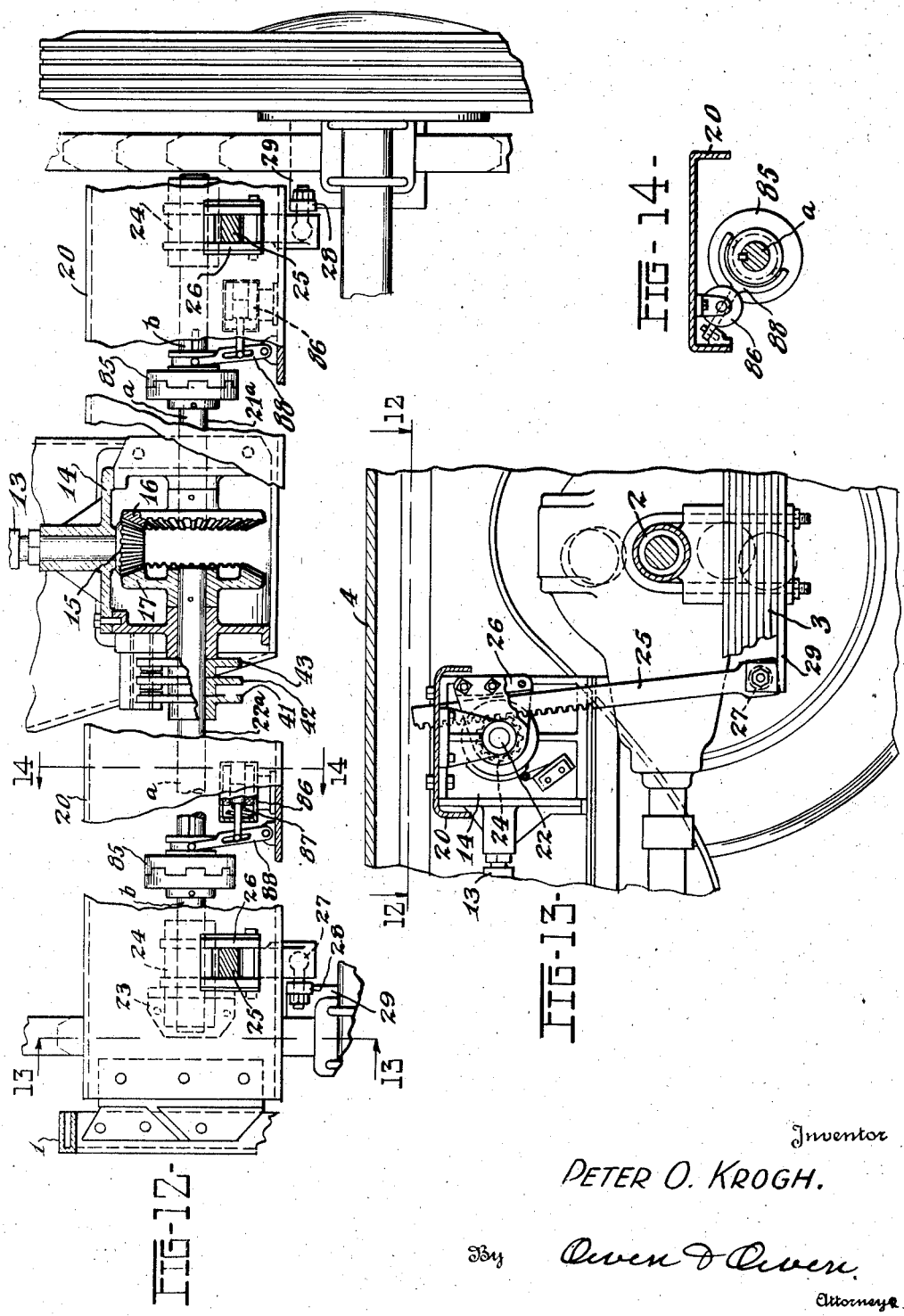

Patented July 20, 1943

2,324,587

UNITED STATES PATENT OFFICE 2,324,587

LEVELING MEANS FOR VEHICLE BODIES

Peter O. Krogh, Lima, Ohio, assignor to Superior Coach Corporation, Lima, Ohio, a corporation of Ohio Application July 31, 1941, Serial No. 404,931

24 Claims. (Cl. 280—6)

This invention relates to leveling means for use in vehicles, and is particularly intended for use in connection with hearses to level the bodies thereof to facilitate placing caskets therein or removing them therefrom. The present application is filed as a continuation in part of my application Serial No. 333,798, filed May 7, 1940, now abandoned.

The object of the invention is the provision of a novel, simple, efficient and easily controlled leveling means of the character described, which is operable to uniformly raise one side and lower the other side of a vehicle body a predetermined extent within limits relative to the chassis wheels and then to return the parts to normal position.

A further object of the invention is the provision of a leveling means of this character which is normally free from operating connection between the vehicle body and chassis axle, or between the leveling and power source therefor, and has controlled means for effecting a positive mechanical connection therebetween to render the leveling means operative.

A further object of the invention is the provision of a leveling means of this character which is manually controlled to effect a raising of one side or the other of a vehicle body during a leveling operation and is automatically controlled to stop such action when a predetermined leveling limit has been reached.

A further object of the invention is the provision in combination with a leveling means of the character described of a reversible electric drive motor therefor, and a control for said motor selectively operable to effect a driving of the motor in one direction or the other a desired extent for leveling and automatically operable to stop such action when a predetermined limit has been reached, said control being also operable to drive the motor in a direction to return the parts to normal position.

Further objects and advantages of the invention will be apparent from the following description, and from the accompanying drawings, in which—

Figure 1 is a fragmentary sectional detail taken lengthwise of a vehicle and at one side of the leveling means embodying the invention, with parts in diagram; Fig. 2 is a fragmentary plan view thereof, with parts broken away and in section; Fig. 3 is a fragmentary elevation on the line 3—3 in Fig. 2, with parts broken away and parts in full; Fig. 4 is a section on the line 4—4 in Fig. 3; Fig. 5 is a working diagram of the electrical wiring and parts; Figs. 6, 7 and 8 are diagrams, respectively, of the "coupling and pilot light" circuit, the "leveling" circuit and the "return" circuit with the movable parts of the latter in a leveling position; Fig. 9 is a fragmentary view similar to Fig. 1 showing a modification of one of the jacks and its disengaging feature with the jack parts engaged; Fig. 10 is a fragmentary view of the jack feature shown in Fig. 9 with the jack parts released; Fig. 11 is a section on the line 11—11 in Fig. 9; Fig. 12 is a fragmentary sectional view similar to Fig. 2 showing still another modification of the control means for the jacks, which includes clutches on the shafts with the jack pinions; Fig. 13 is an enlarged section on the line 13—13 in Fig. 12, and Fig. 14 is an enlarged section on the line 14—14 in Fig. 12 with a part in full.

Referring to the drawings, 1 designates a longitudinal frame member, 2 the rear axle and 3 one of the rear springs of a vehicle chassis, and 4 the floor of a body mounted on the chassis frame. The leveling means embodying the invention is rigidly suspended in any suitable manner from the under side of the body 1 or from the chassis frame, or both, and is adapted to have connection with the axle 2 at or adjacent to each rear spring 3.

The leveling means in its present embodiment includes an electric motor 10 of the reversible type, a speed reduction gearing disposed in a case 11 and interposed between the drive shaft 12 of the motor and a driven shaft 13. This latter shaft extends into a case 14 containing a set of bevel gears including a bevel drive pinion 15 on the shaft and opposing bevel gears 16, 17, driven thereby in opposite directions. The motor 10, the reduction gear case 11, and the bevel gear case 14 are mounted on a bed plate 18 suitably suspended from the body 4 or chassis frame 1 lengthwise thereof, preferably at one side of its longitudinal center.

The bevel gear case 14 is capped by a cross-channel member 20 extending at each end to near the respective side of the floor 4. The member 20 is rigidly secured in any suitable manner to the vehicle body or the chassis frame to have movements therewith. Extending from the respective gears 16 and 17 out beyond said case are respective right and left driven shaft sections 21 and 22. Each shaft section has at its inner end a bearing in a side of the case 14 and at its outer end a bearing in a respective hanger 23 secured to and depending from the under side of the member 20.

A jack is interposed between each shaft section 21, 22, and the respective end of the axle 2. In the embodiment of the invention illustrated in Figs. 1 to 4 each of such jacks includes a rack pinion 25 fixedly mounted on each shaft section 21, 22 near its outer end and meshing with a respective rack-bar 26, which is guided and retained in mesh therewith by a yoke 27. This yoke is loose on the shaft section in straddling relation to the pinion and preferably has one or more rollers at its outer side in engagement with the back edge of the rack-bar. The lower end of each rack-bar 26 is mounted for lengthwise sliding movements in a respective guide block 28 that is anchored to the axle 2. In the present instance the guide block has a swivel connection 29 with the axle through the spring pad 30 to which the member 31 carrying the swivel pin is fixed by welding, or in any other suitable manner.

Each rack-bar 26 and its guide block 28 are normally free for relative sliding movements and are coupled together by a pin 33 when it is desired to render the jack operative and to effect a leveling action. The coupling pin 33 constitutes or is an extension of the movable core member of a respective solenoid 34, the case of which is mounted on a side of the respective guide block 28 with the pin transverse to the longitudinal axes of the rack-bar and block. The pin 33 works through a side opening in the guide block and when projected, by an energizing of the solenoid, engages into a registering one of a series of holes 35 provided in longitudinal spaced order in the rack-bar. It is apparent that the pin 33 moves into the first hole 35 which registers therewith after an energizing of the solenoid, thus rendering the jack operative by coupling the rack-bar and its guide block together, so that an actuation of the rack-bar will effect a positive raising or lowering of the respective side of the vehicle relative to the axle 2, depending on the direction of movement of the rack-bar. The direction of driving of the motor shaft, due to its bevel gear set connections with the shaft sections 21, 22, determines which side of the vehicle is raised and which lowered. In this connection it will be understood that the coupling or rendering operative of both jacks of a set is simultaneous so that the operation of one jack effects a raising of its side of the vehicle body, while the operation of the other jack effects a corresponding lowering of the other side of the body. The coupling pins 33 of the solenoids are spring retracted so that when the solenoids are deenergized and the binding stress of the jack members 26 and 28 thereon is released, upon a return of the vehicle body to normal position relative to the chassis axle, the pins will be retracted to release their coupling connections.

The shaft section 22 in the present instance carries three cams Nos. 1, 2 and 3, which automatically control certain phases of the electrical-control operations, as hereinafter described. These cams are noted in the diagram (Fig. 5) as Nos. 1, 2 and 3 cams.

The electrical control for the leveling means includes a main leveling control switch 45, in the present instance of the double-throw single-pole type, and two single leveling switches 46 and 47, which latter are selectively closed when it is desired to raise the right or left sides, respectively, of the vehicle body.

This control also includes three automatic switches 48, 49 and 50 associated with and operated, respectively, by the cams Nos. 1, 2 and 3. The "center" control switch 48 is of the single-pole type and is open when the cams are in neutral or at-rest position, and is closed when cam No. 1 is moved slightly in either direction from neutral, due to the roller on the switch arm dropping from the high point $a$ on the cam.

The "differentiating" control switch 49 is of the single-pole double-throw type and its cam engaging roller is on the intermediate portion $d$ of the cam when the cams are in neutral or rest position, as shown in Fig. 5. This switch does not have a neutral or open position, but is in closing relation either with the line GT or the line RT, except when shifting from one to the other. The associated cam No. 2 for the switch 49 has two diametrically opposed peripheral arc portions $b$ and $c$, each approximately 180° in length, one forming a high and the other a low surface on the cam. This cam also has an intermediate portion $d$ between the cam portions $b$ and $c$ at the starting end thereof and substantially centrally upon which the switch roller rests when the cams are in neutral or at-rest position. When the cam No. 2 is turned in clockwise direction, the switch 49 is operated to close the GT circuit in which the left leveling switch 47 is disposed, and when turned in counterclockwise direction the switch 49 is operated in close to RT circuit in which the right leveling switch 46 is disposed.

The "limit" control switch 50 in association with No. 3 cam is normally closed and is only opened when the switch roller passes from the long low arc portion $e$ of the cam to the shorter high portion $f$ thereof when the cam has nearly reached a half revolution in either direction from neutral or rest position.

The wiring employed includes three major circuits, one a "coupling and pilot light" circuit (Fig. 6), another a "leveling" circuit (Fig. 7), and still another a "return" circuit (Fig. 8), the first and last of such circuits being controlled primarily by the main switch 45.

The "coupling and pilot light" circuit includes the two solenoids 34, 34, one for each jack of the leveling means, a pilot light switch 61 in association with each solenoid, and a pilot light 62, preferably red. When the handle of the main or "leveling" control switch 45 is moved to the left, it closes the supply line RNT with the two solenoids 34 through the line RBT, thereby energizing the solenoids to effect a projection of the coupling pins 33 to couple the jack members. The movement of the two solenoid cores also effects a closing of the two pilot light switches 61 to close the signal line BC, which is connected to the supply line RNT.

The "return" circuit (Fig. 8) is also controlled by the main switch 45, as a movement to the right of the handle of such switch 45 opens the solenoid operating circuit RBT, thus permitting a retraction, by spring action, of the solenoid actuated coupling pins and a consequent opening of the switches 61. At the same time the circuit is closed between the supply line RNT and the automatic switch line RC in which the "central" control switch 48 is located. While the switch 48 is open when the cams are in normal or at-rest position and the leveling means is inactive, it is closed immediately upon the cams commencing to rotate, and when closed it closes the connection between the RC line and the movable member of the switch 49 through the line N, and also closes the connection between the line RC and return pilot light 65 (preferably green) through the line N'.

The "leveling" circuit (Fig. 7) includes both the right and the left leveling switches 46, 47, the automatic "limit" control switch 50, which is operated by the cam 3, and the clockwise and counterclockwise contactor coils 68, 69, respectively, of the motor. If, for instance, the operator desires for leveling purposes to raise the right side of the vehicle body, he presses the switch 46 to close the circuit between the lines RGC and RT, the former being in connection with the supply line RNT through the interposed "limit" control switch 50, which is normally closed and is only opened when the associated cam No. 3 has moved in either direction to "limit" position and the switch roller has passed onto the high portion $f$ of the cam. The switch 46 is also in circuit through the line RT with the clockwise contactor coil 68 of the motor. It is thus apparent that when the switch 46 is closed, current flows from the source through the normally closed "limit" switch 50 and clockwise contactor coil 68 to effect a driving of the motor in clockwise direction, which is the same direction that the cams Nos. 1, 2 and 3 are then being turned. This action of the motor causes operation of the right hand jack 26, 27, 28, to raise such side of the vehicle body relative to the axle, and operation of the left hand jack to correspondingly lower that side of the body relative to the axle. This leveling action continues until the body reaches level position, when the operator releases the "leveling" control switch 46 or until a limit leveling position is reached, at which point the roller of the "limit" control switch 50 has passed onto the high portion $f$ of the cam No. 3 and effects an automatic opening of the switch 50 and a consequent opening of the motor circuit.

When it is desired to raise the left side of the vehicle body in a leveling operation, the left leveling switch 47 is closed and the operation is the same as takes place when the right switch 46 is closed, except that the left switch (Fig. 7) is connected through the line GT with the counterclockwise contactor coil 69 of the motor, thereby causing a driving of the motor in counterclockwise direction and a corresponding driving of the cams. The switch 47 has the same RGC connection with the "limit" control switch 50 as the switch 46.

The "return" circuit (Fig. 8), which is for the purpose of effecting a return of the parts to normal position, after a leveling operation has been effected, includes in its operation the main "leveling" control switch 45, the "center" control switch 48, and the "differential" control switch 49, together with the return pilot light 65. The closing of the "return" circuit is effected by a throwing of the control handle of the main switch 45 to the right, which opens the "coupling and pilot light" circuit (Fig. 6) and closes the "return" circuit (Fig. 8), the latter being closed through the switch connection of the supply line RNT with the line RC. It will be understood that at this point in the operation the associated cams Nos. 1 and 2 will be out of their neutral or at-rest positions shown in Fig. 5, with the roller of the switch 48 on the low portion of its cam and with the roller of the switch 49 on either the low or high portion of its cam, depending on whether the right or left side of the vehicle body is up. Therefore, at this point in the operation the switch 48 is closed and the switch 49 is in either closed circuit connection with the line GT or with the line RT. It is thus apparent that the "return" pilot light 65 is lighted as soon as the RC line is closed through the main switch 45, and also that if the right side of the body is up and the switch 49 thus closed to the line GT, the switch line is thereby closed to the counterclockwise control coil 69, thereby causing a reverse operation of the motor to that imparting the leveling connection. As soon as the parts, by this reverse action, have been moved to neutral or at-rest position, the short raised portion $a$ of the cam No. 1 will have moved into engagement with the roller of the switch 48 and effected an opening of such switch and a consequent opening of the "return" circuit, notwithstanding the main control switch 45 remains in closed relation to the line RC. It is apparent that if the left side of the vehicle body, during a leveling operation, is raised by a counterclockwise action of the motor, the roller of the switch 49, by reason of its travel on the high portion of the cam No. 2, will effect a closing of the switch line with the line RT, which is in connection with the clockwise contactor coil of the motor, so that the motor will be driven in clockwise direction to return the parts to normal position, and that when such point is reached the "center" control switch 48 will be opened by the roller passing up on the high portion $a$ of the cam No. 1.

It will be understood that during the "return" operation, no current passes through the "limit" control switch 50 because neither of the contact leveling switches 46 or 47 are closed. It will further be understood that the lines RBT and RC, which connect with the main control switch 45, cannot be simultaneously electrically connected to the current source.

It is apparent from the foregoing that when a "leveling" operation is desired, the operator throws the main control switch 45 to the left (Fig. 6), thereby closing the "coupler and pilot light" circuits (RNT—RBT) to effect an engagement of the jack couplers and to indicate by the pilot light 62 that such engagement is effected. The next operation is to press either the right or left "leveling" switch 46, 47 (Fig. 7), depending on the side of the vehicle body it is desired to raise for leveling purposes. This action closes the supply line circuit RNT to either the clockwise or counterclockwise contactor coils 68, 69 of the motor to effect a driving of the motor in the desired direction, and when the desired height has been obtained, the operator releases the switch to stop the motor action and cause the vehicle body to remain in leveled position. If the "leveling" switch is not released before the leveling limit is reached, the motor circuit will be automatically opened by the action of cam No. 3 on the "limit" control switch 50. When it is desired to return the vehicle body to normal position relative to the chassis axle, the "leveling" control switch 45 is thrown to the right (Fig. 8), thus cutting off the current to the coupler solenoids 34, so that the coupler pins may return by spring action to their released positions as soon as the strain of the coupled jack parts has been relieved therefrom. When this action is effected, the pilot switches 61 are opened, thereby cutting off the current to the solenoid pilot light 62. The switch 45 when thrown to the right also closes the supply circuit (RC) to the automatic switch 48 (now in closed position) and through the switch 49 to the proper one of the contactor coils 68, 69 of the motor to effect a lowering operation. When the parts have reached normal position during this return action, the high point a on the No. 1 cam will have moved into engagement with and effected an opening of the "center" control switch 48 to cut off the current supply to the motor.

In Figs. 9 to 11, each of the jack units comprises a single-piece rack-bar 75 which is swivelly connected at its lower end as at 76 to the spring pad 30 and has its upper end swingable into and out of engagement with the jack pinion 25 by the action of a solenoid 77 which when energized is operable through toggle links 78, 79 to move the rack-bar into operating engagement with the pinion. The outer end of the toggle link 78 is pivoted to a bracket 80 projecting down from the floor 4, while the outer end of the companion link 79 is forked to straddle the rack-bar and carries a roller which operates in a slide 81 in the rack-bar. The rack engaging end of the link 79 is swingingly supported by a link 82 suspended from the floor 4 so that the line of thrust of the link on the rack-bar at all times substantially intersects the axis of the pinion. A spring 83 acts on the solenoid plunger to normally hold the solenoid plunger projected and the toggle 78, 79 broken, with the rack-bar 75 held in released position, as shown in Fig. 10. When the solenoids 77, 77 are energized, the rack-bars 75 of the two jacks are thrown into mesh with the respective pinions 25, so that the jacks are rendered operative and caused to effect a leveling action of the vehicle body when the pinions are reversely driven. It will be understood that the solenoids 77 take the place of the coupling solenoids 34 in the first described form of the invention and are controlled in the same manner as described for the solenoids 34.

In Figs. 12, 13 and 14 is illustrated a form of jack unit wherein the rack-bar and pinion of each unit are in permanent engagement, and the coupling means, to render each jack unit operative or inoperative, is disposed between the respective drive pinion and the power source. In the present instance, each of the pinion driving shafts, here designated 21a and 22a and corresponding with the shafts 21 and 22 of the first described forms, is divided into an inner section a, adjacent to the power source, and an outer section b, which latter fixedly carries the rack pinion. In each shaft 21a, 22a, between its respective sections a and b, is disposed a normally disengaged clutch 85, the movable member of which is connected to the plunger of a solenoid 86 and thrown into engagement with its companion by an energizing of the solenoid. In the present instance, the plunger of each solenoid 86 is normally retracted by a spring 87 and has connection with the movable member of the clutch through a shipper lever 88, as well understood in the art. With this form of jack control the two solenoids 86, 86 take the place of the solenoids 34, 34 of the first described form, and when energized effect an engagement of the respective clutches to render the jacks operative instead of rendering such jacks operative by a coupling of the rack-bar members as in said first form.

I wish it understood that my invention is not limited to any specific construction, arrangement or form of the parts, as it is capable of numerous modifications and changes without departing from the spirit of the claims and that the term "chassis" as used in the claims excludes the frame 1 which constitutes a fixed part of the vehicle body.

Having thus described my invention, what I claim as new, and desire to secure by United States Letters Patent, is:

1. In a vehicle body leveling means, a jack having separate parts for connection respectively to a vehicle body and chassis axle and normally disengaged for free relative movements, means operable to couple said jack parts together to render them effective as a jack, means operable to actuate the jack to raise or lower the connected portion of a vehicle body with which associated relative to its chassis axle when the jack parts are coupled together, said last means including a rotatable element, and means actuated at a predetermined point in a rotation of said element to limit the action of said jack operating means.

2. In a vehicle body leveling means, a jack having separate parts for connection respectively to the body and chassis axle of a vehicle and normally disengaged for free relative movements, means electrically operable to couple said jack parts together to prevent relative movements thereof, and electrically controlled means operable to actuate the jack to raise or lower the connected portions of a vehicle body relative to its chassis axle when the jack parts are coupled together.

3. The combination with an axle and the spring supported body of a vehicle, of a leveling mechanism for the body including a reversible shaft carried by one of said vehicle elements, a drive pinion thereon, a rack-bar in mesh with said pinion and normally disconnected from the other of said vehicle elements, means operable to connect the rack-bar to the other of said vehicle elements, and means selectively operable to drive the pinion in one direction or the other to move the rack-bar to raise or lower the body relative to the axle after a connection of said rack bar.

4. The combination with an axle and the spring supported body of a vehicle, of a leveling mechanism for the body including a reversible shaft carried by one of said vehicle elements, a drive pinion on the shaft, a rack-bar in mesh with the pinion, electrically controlled means operable to connect the rack-bar and the other of said vehicle elements, and means selectively operable, after a connection of the rack bar, to drive the pinion in one direction or the other to cause a variance in the effective length of the rack-bar and its connection between the body and axle whereby to raise or lower the connected portion of the body relative to the axle.

5. The combination with an axle and the spring supported body of a vehicle, of a leveling mechanism including a reversible pinion carried by one of said vehicle elements, a bar interposed between and connecting said pinion and the other of said vehicle elements said bar having two slidingly engaged parts, one of said parts comprising a rack-bar in mesh with said pinion, means operable to couple said bar parts together, and means operable to selectively drive said pinion in one direction or the other to actuate the bar to raise or lower the connected portion of the body relative to the axle when the bar parts are coupled.

6. The combination with an axle and the spring supported body of a vehicle, of a leveling mechanism for the body including a jack at each side portion of the body, each jack having separate relatively movable parts connected respectively to the body and axle, means operable to couple the parts of each jack together to render each jack effective, and means operable to actuate each jack to simultaneously raise one side of the body and lower the other relative to the axle when the jack parts are coupled.

7. In a vehicle having spring separated axle and body elements, the combination of a leveling mechanism including a jack interposed between the vehicle body and axle at opposite sides of the longitudinal center line of the vehicle, each jack having separate relatively movable parts permitting free unrestricted movements of the body and axle toward and away from each other, means operable to couple said parts together to prevent such relative movements, and means connected to one of said parts of each jack and operable to impart simultaneous reverse movements thereto when the parts are coupled to effect a raising of one side and a lowering of the other side of the body relative to the axle.

8. The combination with an axle and the spring supported body of a vehicle, of a leveling mechanism for the body including at each side thereof a jack having a rack-bar member, means electrically operable to simultaneously couple each rack-bar member to one of said vehicle elements, and electrically controlled means carried by the other of said vehicle elements and operable to actuate said rack-bars simultaneously in reverse directions to effect a raising of one side and a lowering of the other side of the vehicle body relative to the axle when said coupling means is engaged.

9. The combination with an axle and the spring supported body of a vehicle, of a leveling mechanism for the body including a rack-bar at each side of the vehicle, means operable to couple each rack-bar to the axle during leveling operations, electrically controlled means carried by the body and having driving connection with said rack-bars to simultaneously raise one and lower the other and impart corresponding movement to the respective side of the body relative to the axle when the bars are coupled to the axle, means for selectively driving said last means in one direction or the other, and means automatically operable to stop the driving action of said last means when the jacks have been operated a predetermined extent.

10. The combination with an axle and the spring supported body of a vehicle, of a mechanism for leveling the body relative to the axle including two jacks one at each side portion of the body, said jacks including rack bars and being normally free to permit relative movements of the body and axle, means electrically operable to couple each jack to prevent said relative movements, and means selectively operable to impart simultaneous reverse action to said jacks when coupled to raise either side of the body relative to the axle.

11. The combination with an axle and the spring supported body of a vehicle, of a leveling mechanism for the body including a normally inoperative jack connecting the body and axle adjacent to one side thereof, a coupling means for the jack to render it operative, means including a reversible electric motor for operating the jack to raise or lower the connected portion of the body relative to the axle, manually controlled electrical means for actuating the jack coupling means to render it operative, and a leveling control circuit for said motor including manually controlled parts selectively operable to actuate the jack to raise or lower the connected body portion relative to the axle.

12. The combination with an axle and the spring supported body of a vehicle, of a leveling mechanism for the body including a normally inoperative jack connecting the body and axle adjacent to one side thereof, a coupling means for the jack to render it operative, means including a reversible electric motor for operating the jack to raise or lower the connected portion of the body relative to the axle, manually controlled electrical means for actuating the jack coupling means to render it operative, a leveling control circuit for said motor including parts selectively and manually operable to actuate the jack when coupled to raise or lower the connected body portion relative to the axle, and a return control circuit including parts which when the circuit is closed automatically select the return direction of drive of the motor and also parts for automatically opening the circuit and stopping the return action when the body is returned to predetermined position relative to the axle.

13. The combination with an axle and the spring supported body of a vehicle, of a leveling mechanism for the body including two normally inoperative jacks connecting the axle and body, one at each side portion thereof, manually controlled means operable to render both jacks operative, driving means operable to simultaneously drive the jacks to effect a raising of one side and a lowering of the other side of the body and vice versa, a reversible electric motor in driving connection with said driving means, and control means for the motor circuit including means manually operable to effect a selective driving of the motor in one direction or the other to level the body and automatically operable to stop the driving action when the jacks have been operated a predetermined extent, said control means also having provision to cause a driving of the motor to return the body from leveling to normal position and to automatically select the proper direction of driving for the purpose.

14. The combination with an axle and the spring supported body of a vehicle, of a jack interposed between said axle and body at one side thereof, said jack having parts normally disconnected permitting free unrestricted movements of the body and axle toward and away from each other, manually controlled means for coupling said jack parts together to render the jack operative, a manually controlled reversible drive means having connection with said jack to effect a lengthening or shortening thereof when the drive means is driven in one direction or the other and when the jack parts are coupled together, and means automatically operable to stop said drive means when a predetermined limit in a lengthening action of the jack has been reached.

15. The combination with an axle and the spring supported body of a vehicle, of a jack interposed between said axle and body at one side thereof, means operable to render said jack operative to connect said axle body to raise the body, and a manually controlled reversible drive means for operating said jack to raise or lower the body relative to the axle when the jack is in operative connection therewith, said drive means having a rotatable part, and means automatically operated by said part at a predetermined point in a raising action of the jack to stop the driving action of the drive means thereon.

16. The combination with an axle and the spring supported body of a vehicle, of a jack interposed between said axle and body at each side thereof and having normally disconnected parts permitting unrestricted free relative movements of the axle and body, manually controlled electrically operated means for effecting a coupling of said parts, and manually controlled means selectively operable to actuate either jack, when coupled, to raise the connected side of the body and lower the other side and to stop such action at will.

17. The combination with an axle and the spring supported body of a vehicle, of a jack interposed between said axle and body at each side thereof and having normally disconnected parts permitting unrestricted free relative movements of the axle and body, manually controlled electrically operated means for effecting a coupling of said parts, manually controlled means selectively operable to actuate either jack, when coupled, to raise the connected side of the body and lower the other side and to stop such action at will, and means automatically operable at a predetermined body raising point of either jack to stop the jack operating action of said jack actuating means.

18. The combination with an axle and the spring supported body of a vehicle, of a jack interposed between said axle and body at one side thereof and having normally disconnected parts permitting unrestricted relative movements of the axle and body, electrically operated coupling means for said parts, a manually controlled operating circuit for said coupling means, a reversible electric motor, a manually controlled electric leveling circuit for said motor operable to actuate the motor to effect a body leveling action of the jack when coupled, and a manually controlled electric return circuit for the motor operable to actuate the motor in a reverse direction to return the body to normal position relative to the axle.

19. An apparatus in accordance with claim 18 wherein means is included in connection with the leveling circuit to automatically open such circuit and stop the motor when the body has reached a predetermined position.

20. An apparatus in accordance with claim 18 wherein means is included in connection with the return circuit to automatically open said circuit and stop the motor when the body has reached a predetermined return position.

21. The combination with an axle and the spring supported body of a vehicle, of a jack interposed between said axle and body at each side thereof, each jack having normally disconnected parts permitting unrestricted relative movements of the axle and body, electrically operated coupling means for each of said jacks to render it operative, a manually controlled operating circuit for said coupling means, a reversible electric motor, a manually controlled electric level circuit for said motor operable to actuate the motor to effect a body leveling action of the jacks, when coupled, a manually controlled electric return circuit for the motor operable to actuate the motor in a reverse direction to return the body to normal position relative to the axle, and means in connection with said return circuit automatically operable to selectively drive the motor in a direction necessary to actuate the jacks to return the body to normal relation to the axle.

22. The combination with an axle and the spring supported body of a vehicle, of a jack interposed between the axle and body and operable to raise or lower one side of the body relative to the axle, said jack including a pinion and a rack bar in meshing relation and the rack bar having two relatively sliding sections one engaging the pinion and the other connected to the axle, manually controlled means for coupling said rack bar sections together to render the jack operative, a reversible motor carried by the body for driving said pinion in one direction or the other to operate the jack to raise or lower the body relative to the axle when the bar sections are coupled, and manually operable control means for the motor.

23. Apparatus in accordance with claim 22, together with means having a part turning with the pinion and operable to automatically stop the motor when a predetermined raising or lowering of the body by the jack has been effected.

24. The combination with an axle and the spring supported body of a vehicle, of a leveling mechanism for the body including a jack connecting the body and axle adjacent to one side thereof and having normally disconnected parts, means operable to connect the jack parts, means for selectively operating the jack when its parts are connected to raise or lower the connected portion of the body relative to the axle, means automatically operable to stop operation of the jack at a predetermined point in a body raising or lowering action thereof, and means operable to actuate the connecting means for the jack parts to disconnect such parts and to return the jack parts and body to normal positions after a raising or lowering thereof.

PETER O. KROGH.

CERTIFICATE OF CORRECTION.

Patent No. 2,324,587. July 20, 1943.

PETER O. KROGH.

It is hereby certified that error appears in the printed specification of the above numbered patent requiring correction as follows: Page 2, second column, line 27, for "in close" read --to close--; page 5, second column, line 64, claim 15, after the word "axle" insert --and--; and that the said Letters Patent should be read with this correction therein that the same may conform to the record of the case in the Patent Office.

Signed and sealed this 24th day of August, A. D. 1943.

(Seal)

Henry Van Arsdale,
Acting Commissioner of Patents.